US007698893B2

(12) United States Patent

Langeder

(10) Patent No.: US 7,698,893 B2
(45) Date of Patent: Apr. 20, 2010

(54) PRESSURE-MEDIUM CYLINDER WITH PRESSURE INTENSIFICATION

(75) Inventor: Rudolf Langeder, Mauthausen (AT)

(73) Assignee: VOEST-ALPINE Industrieanlagenbau GmbH & Co. (AT)

( * ) Notice: Subject to any disclaimer, the term of this patent is extended or adjusted under 35 U.S.C. 154(b) by 267 days.

(21) Appl. No.: 11/571,560

(22) PCT Filed: Jun. 16, 2005

(86) PCT No.: PCT/EP2005/006476

§ 371 (c)(1), (2), (4) Date: May 22, 2007

(87) PCT Pub. No.: WO2006/002772

PCT Pub. Date: Jan. 12, 2006

(65) Prior Publication Data

US 2007/0289440 A1 Dec. 20, 2007

(30) Foreign Application Priority Data

Jul. 2, 2004 (AT) ............................ A 1123/2004

(51) Int. Cl.
*B60T 17/22* (2006.01)

(52) U.S. Cl. ........................................................ 60/534

(58) Field of Classification Search .................. 60/534, 60/563

See application file for complete search history.

(56) References Cited

U.S. PATENT DOCUMENTS 3,883,938 A * 5/1975 Schmidt et al. ............... 92/152

* cited by examiner

*Primary Examiner*—F. Daniel Lopez
(74) *Attorney, Agent, or Firm*—Ostrolenk Faber LLP

(57) ABSTRACT

For many applications pressure-medium cylinders have to achieve high adjusting forces which often impairs the dynamics of such cylinders due to the large piston cross sections and cylinder volumes, and/or pressure medium has to be supplied at very high pressure. The present invention shows a pressure-medium cylinder which has short reaction times, high adjusting forces and small overall sizes, which is achieved in that two cylinders 5, 8 are arranged in the pressure-medium cylinder 1, which cylinders can be activated independently of one another.

15 Claims, 2 Drawing Sheets

PRESSURE-MEDIUM CYLINDER WITH PRESSURE INTENSIFICATION

CROSS REFERENCE TO RELATED APPLICATION

The present application is a 35 U.S.C. §§ 371 national phase conversion of PCT/EP2005/006476, filed 16 Jun. 2005, which claims priority of Austrian Patent Application No. A 112/2004 filed 2 Jul. 2004, which is herein incorporated by reference. The PCT Application was published in the German Language.

BACKGROUND OF THE INVENTION

The present invention relates to a pressure-medium cylinder with pressure intensification, the pressure-medium cylinder having arranged in it two cylinders which are separate from one another and in each of which a piston is arranged, and the piston of the first cylinder having a piston rod which is operatively connected to the second cylinder for the increase in pressure, and to a use of such a pressure-medium cylinder as an adjusting cylinder in a roll stand, and also to a method for operating and regulating such a pressure-medium cylinder.

For specific applications, for example in roll stands, pressure-medium cylinders have to be capable of applying high forces and/or of being regulatable exactly in position. For this purpose, a pressure-medium cylinder, for example a hydraulic cylinder, with a piston of large cross section may be provided, and/or the pressure-medium cylinder must be supplied with pressure medium which is under high pressure. In the first instance, the pressure-medium cylinder becomes very large, and, in the second instance, the operation of the pressure-medium system involves a high outlay. Furthermore, where large cylinders are concerned, a large quantity of pressure medium has to be moved, with the result that the dynamics of such cylinders, that is to say the time for executing adjusting movements of the cylinder, are impaired.

DE 36 30 725 A, then, discloses, for example, a pressure intensification for increasing the pressure in the hydraulic supply line to a hydraulic cylinder. Here, however, the pressure intensifier operates pneumatically, thus necessitating two different supply media and the installations associated with this. The problems described above, however, cannot be solved by means of such pressure intensifiers.

WO 02/053920 A2 shows a hydraulic or hydropneumatic pressure intensifier which combines a low-pressure cylinder and a working cylinder in a housing. In such a pressure intensifier, however, the two pistons cannot be activated independently of one another. Only the low-pressure cylinder which transmits the movement to a working piston can be activated. This, however, also restricts the latitude of movement of the working cylinder, or large volumes and dimensions are again required, with the result that, once more, the dynamics would be impaired. Moreover, the pressure medium for the working cylinder is not supplied from outside, but is enclosed in the pressure intensifier, which may lead to problems with leakage losses, and the pressure medium has to be regularly topped up.

US 2002/0029569 Ai discloses a hydraulic working cylinder, in which a hydraulically activated pressure amplifier piston increases the hydraulic pressure on the working cylinder. In addition, a path measurement system for controlling the piston positions is described. In this case, however, the position of only one piston can be detected.

U.S. Pat. No. 5,207,267 discloses a cylinder which has two pistons operatively connected to one another. Each piston rod has its own measuring device, so a more complex measuring apparatus is required.

SUMMARY OF THE INVENTION

The object of the present invention is, therefore, to specify a hydraulic cylinder which is of compact construction, generates high adjusting forces and has high dynamics.

This object is achieved by means of the invention, in that the cylinders can be activated independently of one another. Since the two cylinders can be activated independently of one another, a large latitude of movement with relatively small cylinder volume and consequently with a small overall size can be implemented. One cylinder can, for example, be prepositioned roughly and the second cylinder can be used for fine positioning under high pressure and with high dynamics. These measures thus make it possible to reduce the overall cylinder size substantially, making it possible to design a pressure-medium cylinder also in a long-stroke version, for example for integration into a roll stand, and entail substantial savings in terms of weight and of manufacturing costs.

Since the two cylinders can be activated independently of one another, such a pressure-medium cylinder can also be operated and activated in an especially flexible and simple way, in that one cylinder is used for rough positioning and a second cylinder is used for fine positioning under high pressure and with low response times.

Particularly advantageously, the pressure-medium cylinder is also equipped with a path measurement system, by means of which the position of at least one of the two cylinder pistons can be detected, since the thus detectable actual position of a piston can be used directly for regulation or control.

The present invention is described below with reference to the exemplary, diagrammatic and non-restrictive FIGS. 1 and 2 in which:

DESCRIPTION OF A PREFERRED EMBODIMENT

Figure 1:
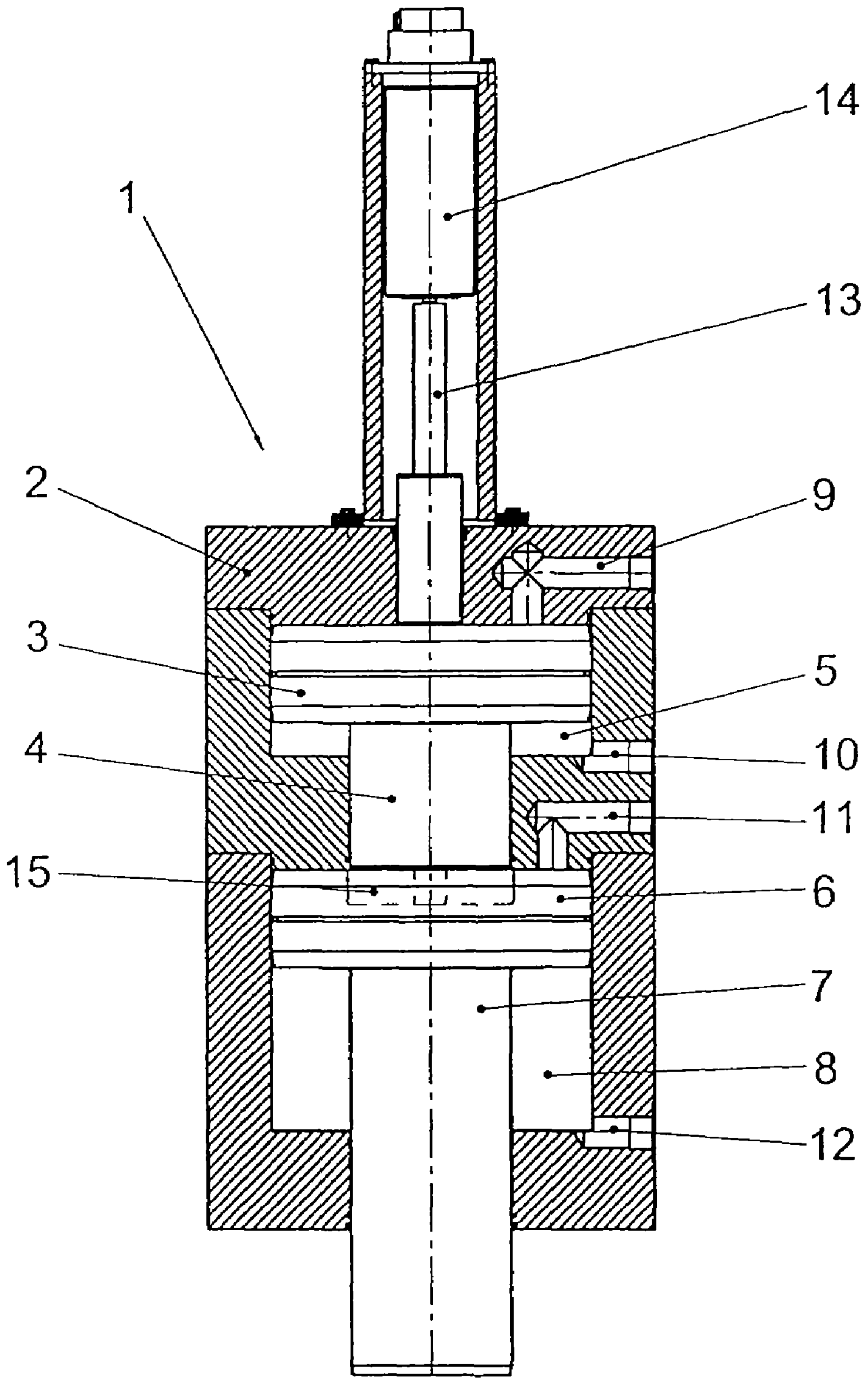
FIG. 1 shows a section through a pressure-medium cylinder according to the invention.

The pressure-medium cylinder, here a hydraulic cylinder 1, according to FIG. 1 has a housing 2, in which two cylinders, a pressure intensification cylinder 5 and an adjusting cylinder 8, are arranged. The two cylinders 5, 8 have arranged in them in each case a piston, a pressure intensification piston 3 and an adjusting piston 6. The exact structural configuration of the cylinders 5, 8 and of the associated pistons 3, 6 may be dispensed with here, since such hydraulic cylinders are sufficiently known and can be designed in the most diverse possible ways.

The pressure intensification cylinder 5 and the adjusting cylinder 8 are in this case separated hydraulically from one another and can be activated independently of one another in each case via a specific supply line 9, 11 and a specific discharge line 10, 12 for hydraulic fluid.

The adjusting piston 6 has an adjusting piston rod 7 which is led outwards through the housing 2 of the hydraulic cylinder 1 and, for example, may be used as any desired actuation means or may be connected to such means. The adjusting piston 6 may also have a depression 15 of the size of the cross section of the pressure intensification piston rod 4, as indicated in FIG. 1, in order, for example in the event of a malfunction, to avoid contact between the pressure intensification piston rod 4 and the adjusting piston 6 and possible damage to these.

The pressure intensification piston 3 is connected to a pressure intensification piston rod 4 which is guided in a partition, formed by part of the housing 2, between the pressure intensification cylinder 5 and adjusting cylinder 8 and which is led through the said partition and is thus operatively connected to the adjusting cylinder 8 or to the hydraulic fluid volume of the adjusting cylinder 8. The pressure intensification piston 3 and the pressure intensification piston rod 4 are dimensioned, here, such that the pressure intensification piston rod 4 does not penetrate into the adjusting-cylinder space in an uppermost position of the pressure intensification piston 3. A piston-side pressure is consequently intensified, that is to say increased, in the ratio of the cross sections of the pressure intensification piston 3 and of the pressure intensification piston rod 4, and therefore the pressure thus increased acts on the adjusting piston 6 on the piston side.

The adjusting piston 6 is connected, further, to a measurement transmitter rod assembly 13 which, here, is led through the pressure intensification piston rod 4, the pressure intensification piston 3 and the housing of the hydraulic cylinder 1 and which is connected to a suitable path measurement system 14, for example a sufficiently known electrical or optical system. It goes without saying, however, that any other desired path measurement system 14 or any other desired path measurement arrangement than that described here could also be provided. The path measurement system 14 may, for example, be linked to a regulation of the hydraulic cylinder 1 and/or to the regulation of a device actuated by the hydraulic cylinder 1, such as, for example, a roll of a roll stand, for example as an actual-value transmitter.

The functioning of the hydraulic cylinder 1 according to the invention is described below by way of example.

Both pistons 3, 6 are connected on the piston side, that is to say at the supply lines 9, 11, to a hydraulic system which is under pressure, for example a pressure of 290 bar. Both cylinders can therefore be supplied by the same hydraulic system. In the case of both cylinders 5, 8, a constant reduced pressure, for example a pressure of approximately 50 bar, prevails on the piston-rod side, that is to say at the discharge lines 10, 12. As is sufficiently known, the activation of the cylinders 5, 8 may take place by means of known servovalves arranged in the supply line 9, 11 and/or discharge line 10, 12.

As a first step, the adjusting piston 6 together with the adjusting piston rod 7 is moved into a predetermined position via the servovalve of the adjusting cylinder 8. This position is transmitted to the path measurement system 14 via the measurement transmitter rod assembly 13 which is connected fixedly to the adjusting piston 6 and is led through the pressure intensification piston 3. The path measurement system 14 may be connected to a suitable regulation. At the time of the positioning of the adjusting piston 6, the pressure intensification piston 3 is in its uppermost position and is inactive. After the positioning of the adjusting piston 6 and consequently of the adjusting piston rod 7 as a result of the activation of the adjusting cylinder 8, its hydraulic supply line 11 is separated from the hydraulic system, for example by means of a valve capable of being shut off, and the regulating function of the hydraulic cylinder 1 is then assumed by the pressure intensification cylinder 5 via its servovalve.

Due to the arrangement according to the invention of the pressure intensification piston 3 and adjusting piston 6, the pressure intensification piston rod 4, the diameter of which is in a specific ratio to the pressure intensification piston diameter, then penetrates into the cylinder space of the adjusting piston 6, the result of which is that a hydraulic pressure multiplied by the ratio of the pressure intensification piston cross section to the pressure intensification piston rod cross section builds up there. The regulating path of the pressure intensifier is in this case multiplied by the same ratio. Thus, as a result of the activation of the pressure intensification cylinder 5, the adjusting piston 6 can be activated and moved with a multiplied pressure. Thus, by means of the hydraulic cylinder 1 according to the invention, it is possible, with a hydraulic system of relatively low pressure and small dimensions, to act upon the adjusting piston 6 with x times the pressure of the hydraulic system. In this example, the intensification ratio is approximately 1 to 4, that is to say the 290 bar piston pressure of the pressure intensifier would generate 1160 bar in the adjusting cylinder 8.

Figure 2:
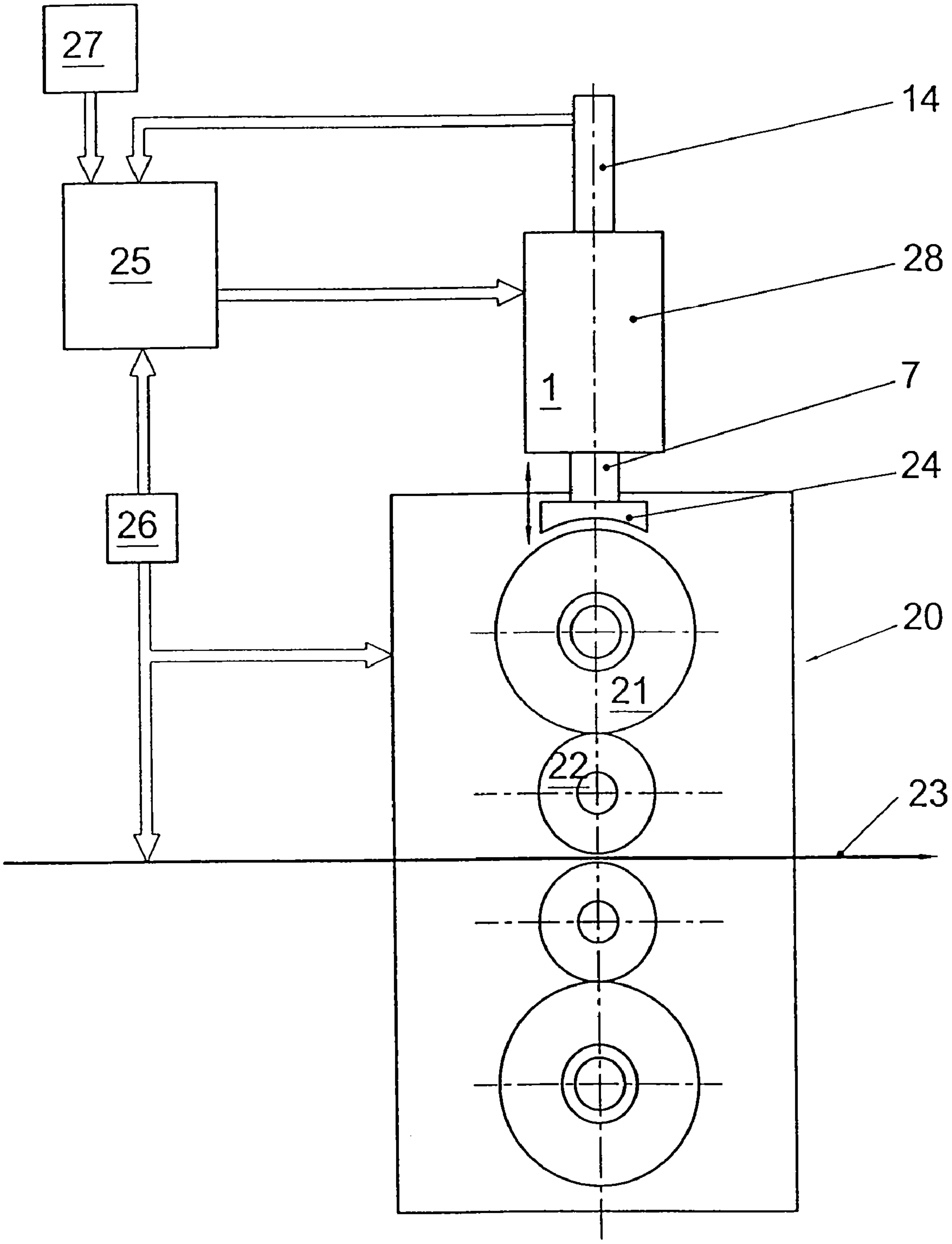
FIG. 2 shows a diagrammatic illustration of a roll stand with a pressure-medium cylinder according to the invention.

Such a hydraulic cylinder 1 may particularly advantageously be used as an adjusting cylinder 28 in a roll stand, as illustrated diagrammatically in FIG. 2.

Here, the roll stand 20 consists of two working rolls 22 and of two supporting rolls 21, and a rolling strip 23 running through between the two working rollers 22 is rolled.

Such arrangements are sufficiently known and do not have to be explained in any more detail here.

The roll stand 20 has arranged on it a hydraulic cylinder 1 according to the invention, the adjusting cylinder 7 of which actuates an adjusting device 24, merely indicated here.

A regulating unit 25 receives measurement data from the path measurement system 14 and activates the hydraulic cylinder 1. The regulating unit 25 may also control further installation parts and also receive measurement data from further sensors 26, as indicated in FIG. 2. The regulating unit 25 may likewise also be linked to an overriding regulation 27, for example an installation regulation.

As described above, then, by means of the regulating unit 25, the hydraulic cylinder 1 levels out, according to the inputs and by the activation of the pressure intensification cylinder 5, with sufficient reaction times, all the roll-nip variations resulting from the different rolling forces. For this purpose, measurement values required can be detected by means of the sensors 26 and supplied to the regulating unit 25. According to experience, paths of the order of between 1 and 5 mm have to be levelled out in a roll stand 20. After the rolling strip 23 has issued from the roll stand 20, the pressure intensification piston 3 is immediately moved into the uppermost position again, and regulation is transferred to the adjusting cylinder 8 of the hydraulic cylinder 1 again. The next cycle commences with the renewed positioning of the latter.

It would, however, also be conceivable, of course, to activate both cylinders 5, 8 simultaneously, that is to say to act upon them simultaneously with hydraulic fluid, if a particular application so requires.

Owing to the small volumes of the two cylinders 5, 8, the hydraulic cylinder 1 still has sufficiently high response times, whilst nevertheless having very high achievable pressures.

At the same time, owing to the possibility of activating the two cylinders 5, 8 independently of one another, the regulatability of the hydraulic cylinder 1 is not impaired. Thus, it is appropriate to use such a pressure-medium cylinder 1 wherever high forces, along with a small space requirement, are required, that is to say, in addition to roll stands, for example, without any restriction also in forging presses or edgers.

A pressure-medium cylinder according to the invention is described above by the example of a hydraulic cylinder 1, but, of course, any other suitable pressure medium, for example air or gas for a pneumatic cylinder, could also be used, in which case there could be minor structural changes without any functional restrictions.

The invention claimed is:

1. Pressure-medium cylinder with pressure intensification, the pressure-medium cylinder having arranged in it two cylinders which are separate from one another and in each of which a piston is arranged, and a first piston of the first cylinder having a first piston rod which is operatively connected to the second cylinder for the increase in pressure, the cylinders being able to be activated independently of one another, and the pressure-medium cylinder having arranged on it a path measurement system, by means of which the movement of at least one of the two pistons, is measured, wherein a measurement transmitter rod assembly is provided, which is led through the first piston and the first piston rod and which is connected at one end to the second piston or to its piston rod and at the other end to the path measurement system.

2. Pressure-medium cylinder according to claim 1, wherein each cylinder has a specific supply line for the pressure medium and a specific discharge line for pressure medium.

3. Pressure-medium cylinder according to claim 1, wherein the first piston rod of the first piston has a smaller cross-sectional area than the first piston.

4. Pressure-medium cylinder according to claim 3, wherein the first piston rod of the first piston is arranged so as to be guided in the housing of the pressure-medium cylinder.

5. Pressure-medium cylinder according to claim 1, wherein the second piston has a second piston rod which is led out of the pressure-medium cylinder.

6. Use of the pressure-medium cylinder according to claim 5 as an adjusting cylinder of a roll of a roll stand.

7. Use according to claim 6, wherein the second piston rod is operatively connected to a roll or a mounting of a roll of a roll stand.

8. Method for regulating a pressure-medium cylinder according to claim 5, wherein the two cylinders are acted upon with pressure medium independently of one another.

9. Method according to claim 8, wherein the movement of the second piston of the second cylinder is detected by means of the path measurement system, and a valve in the pressure-medium supply line and/or pressure-medium discharge line of the second cylinder is activated in such a way that the second piston is moved into a predetermined position, and, subsequently, the movement of the second piston is controlled by means of the movement of the first piston of the first cylinder, in that a valve in the pressure-medium supply line and/or pressure-medium discharge line of the first cylinder is activated.

10. Use of the pressure-medium cylinder according to claim 1 as an adjusting cylinder of a roll of a roll stand.

11. Use according to claim 10, wherein the second piston rod is operatively connected to a roll or a mounting of a roll of a roll stand.

12. Method for operating a pressure-medium cylinder according to claim 1, wherein the two cylinders are acted with pressure medium independently of one another.

13. Method according to claim 12, wherein, first, the second piston of the second cylinder is moved into a predetermined position as a result of the opening and/or closing of a valve in the pressure-medium supply line and/or pressure-medium discharge line of the second cylinder, and, subsequently, the first piston of the first cylinder is moved as a result of the opening and/or closing of a valve in the pressure-medium supply line and/or pressure-medium discharge line of the first cylinder, with the result that the second piston is also moved simultaneously.

14. Method according to claim 12, wherein the first piston is unmoved during the prepositioning of the second piston.

15. Method according to claim 12, wherein the pressure-medium supply line and/or pressure medium discharge line of the second cylinder is shut off during the movement of the first piston.

* * * * *